UNITED STATES PATENT OFFICE.

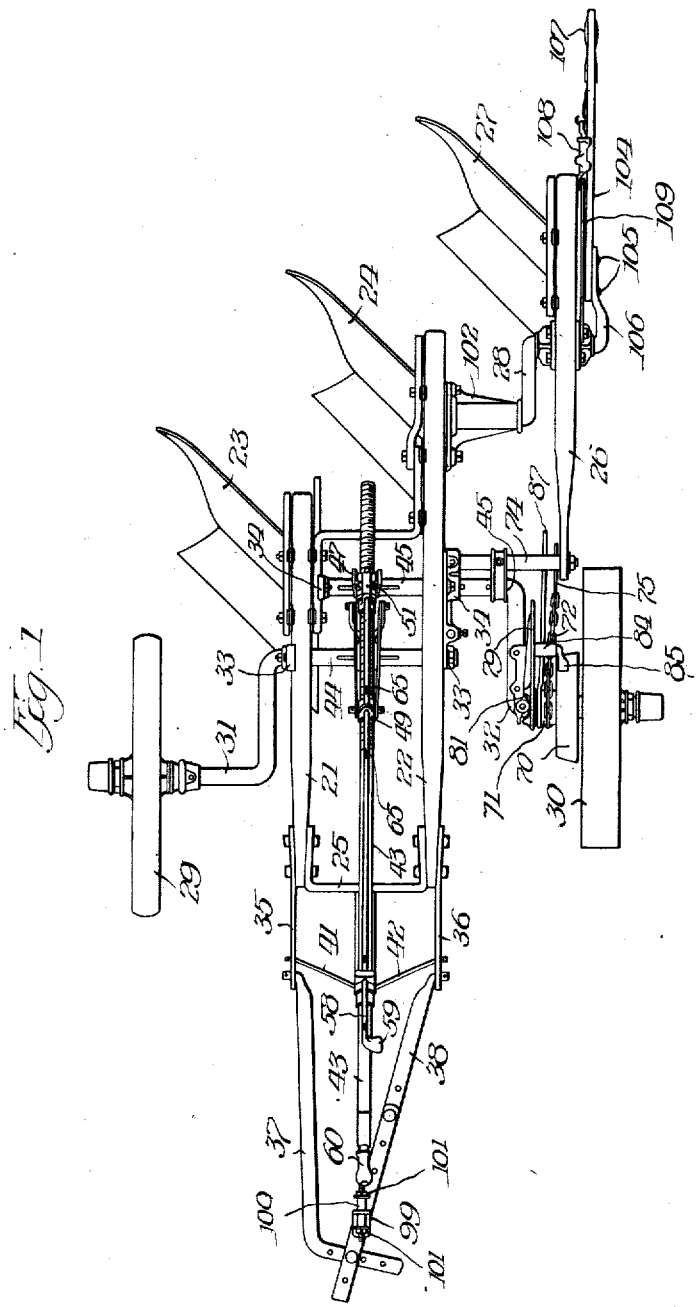

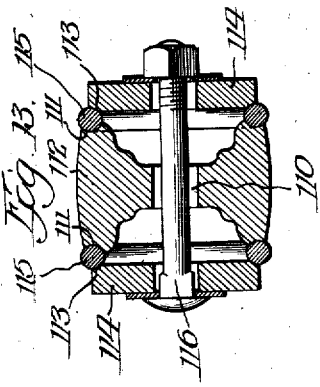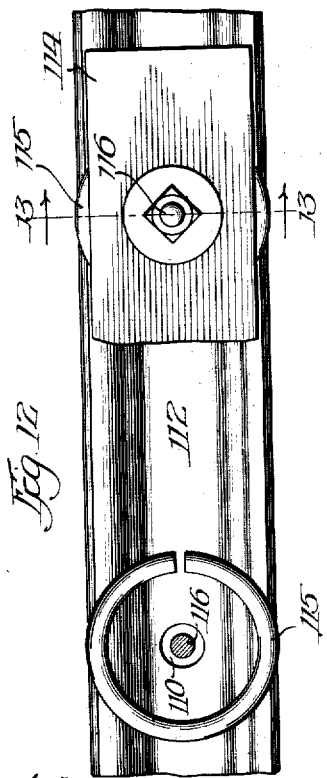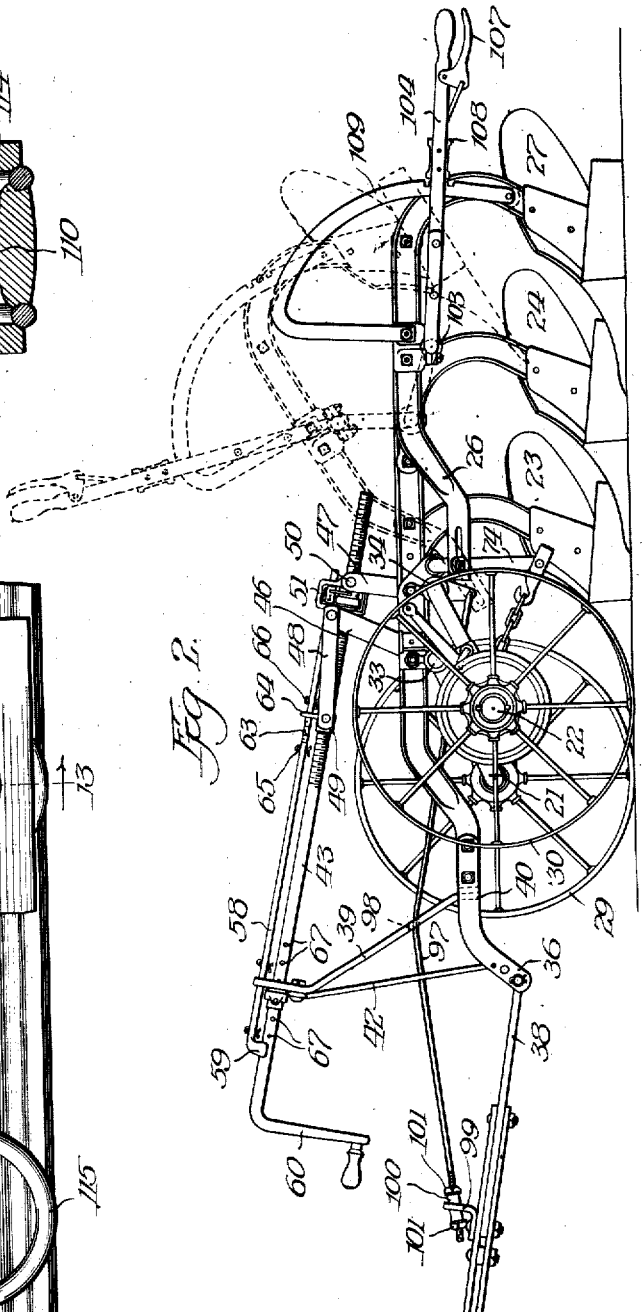

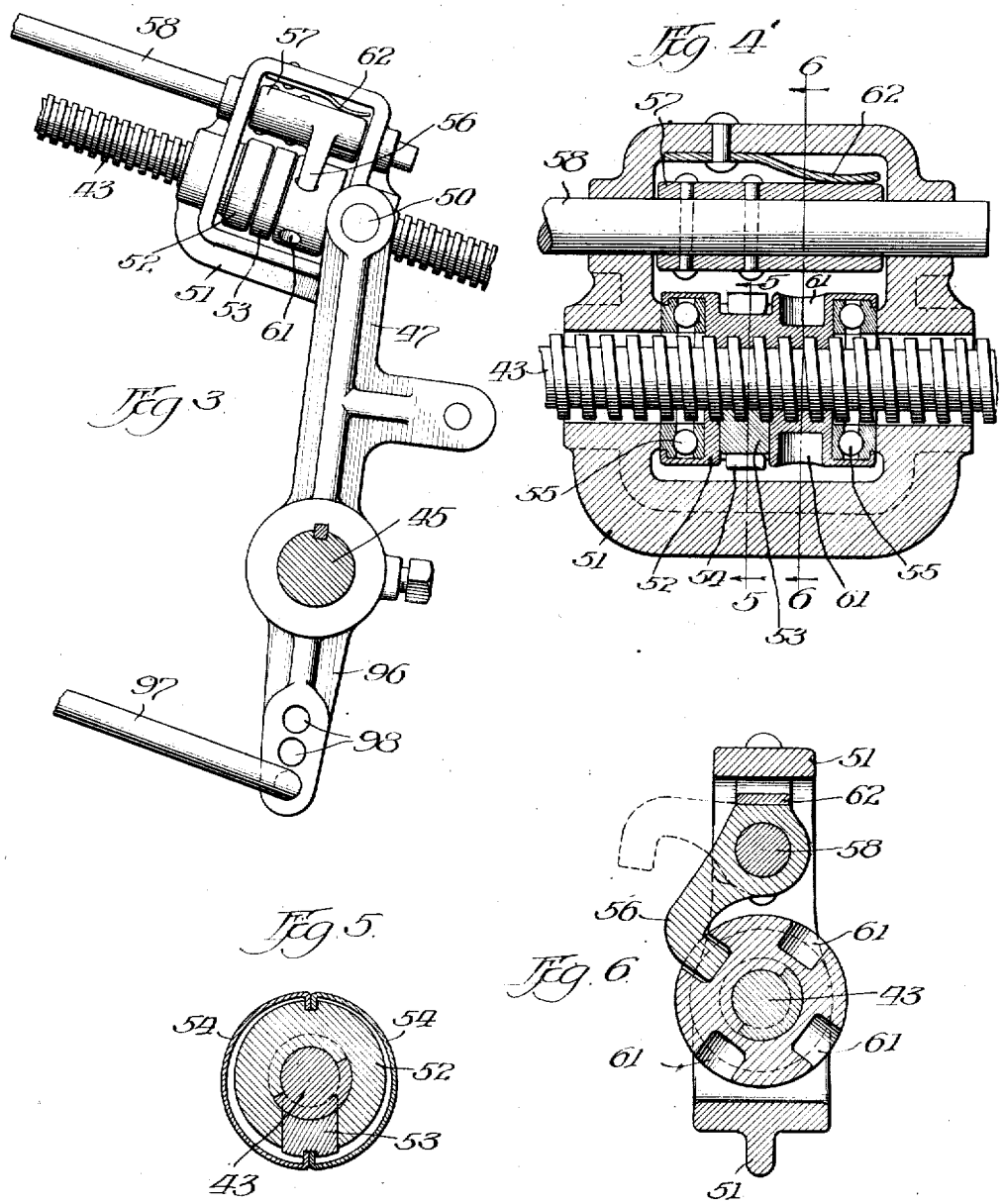

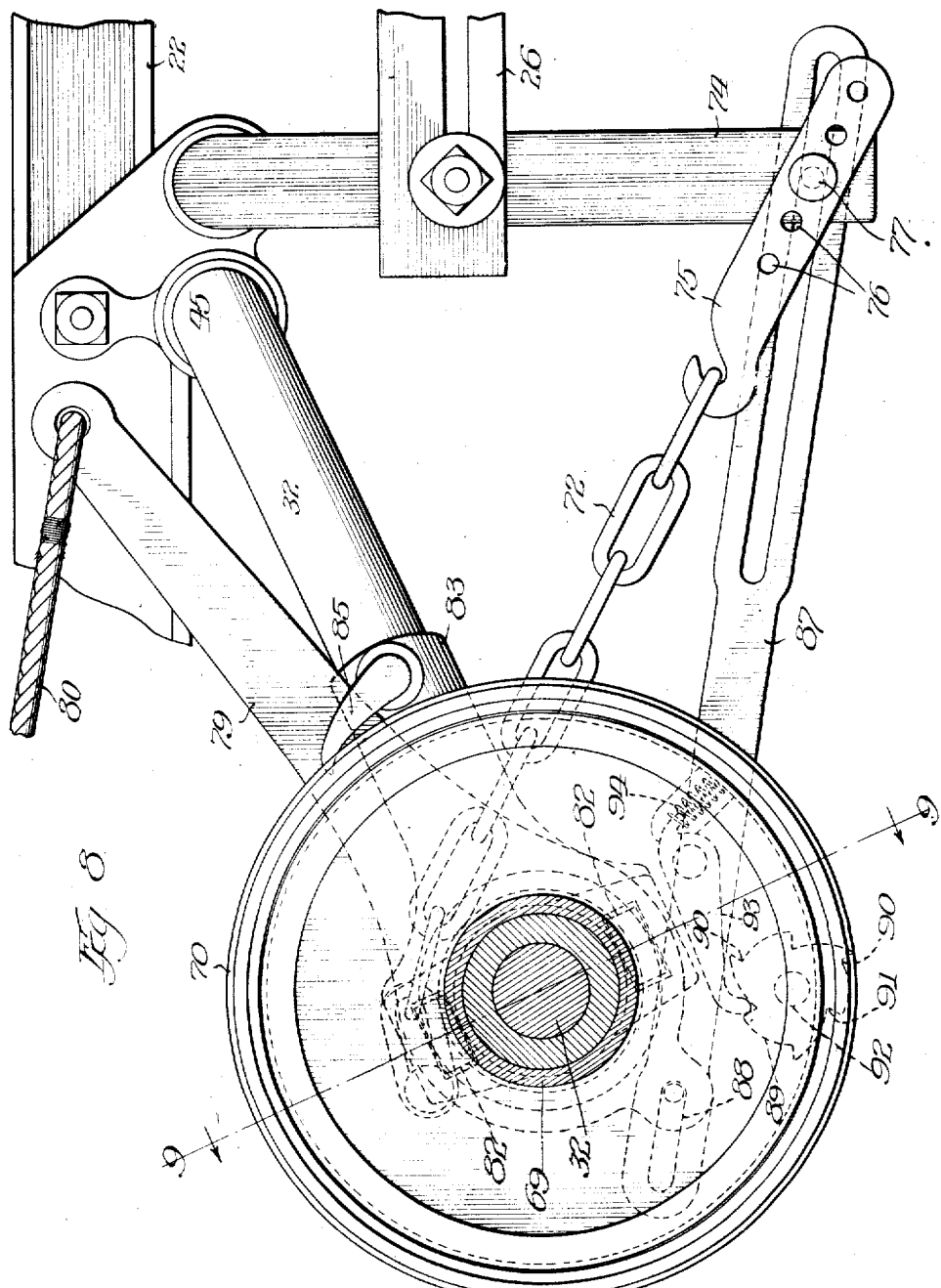

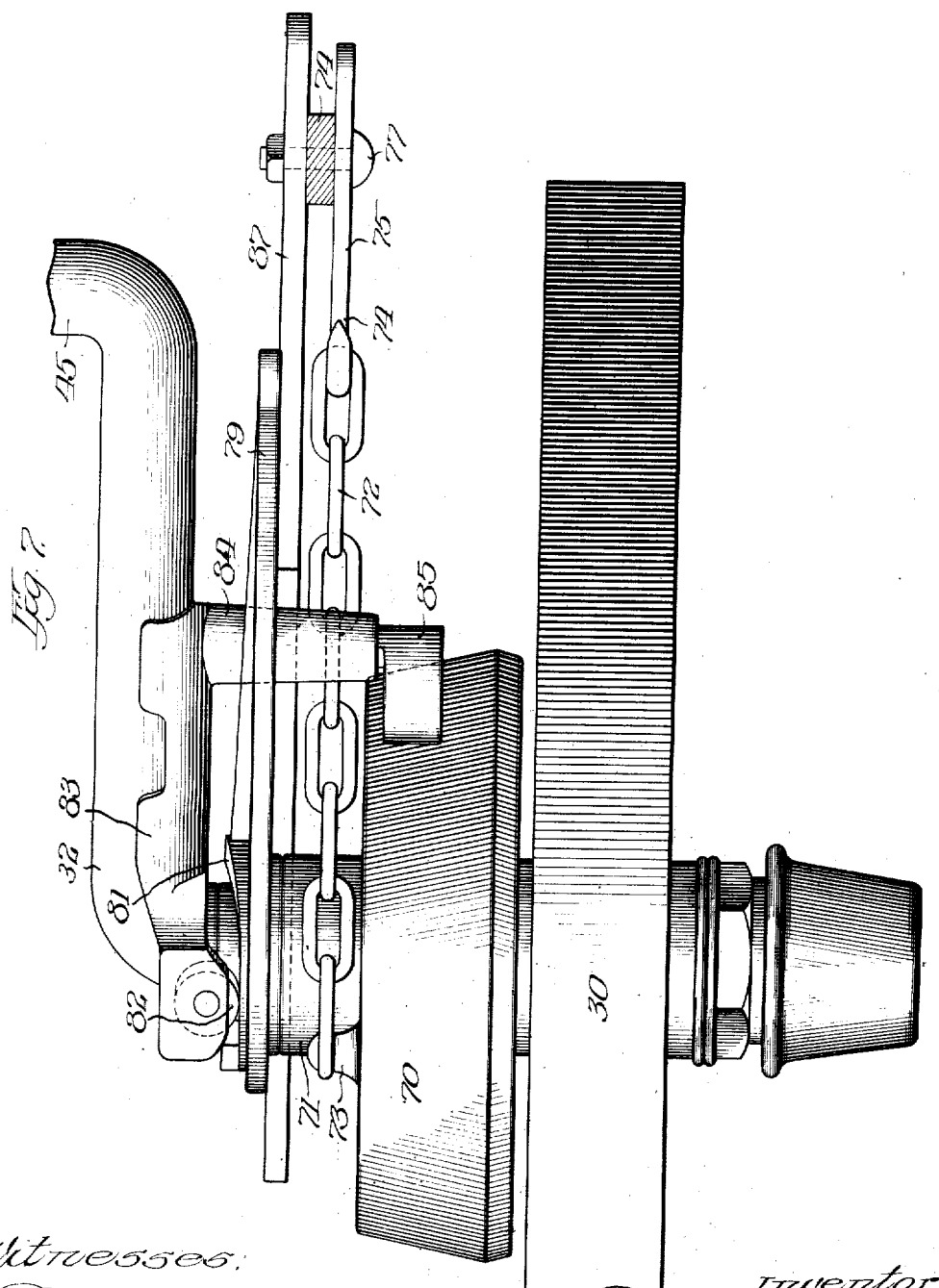

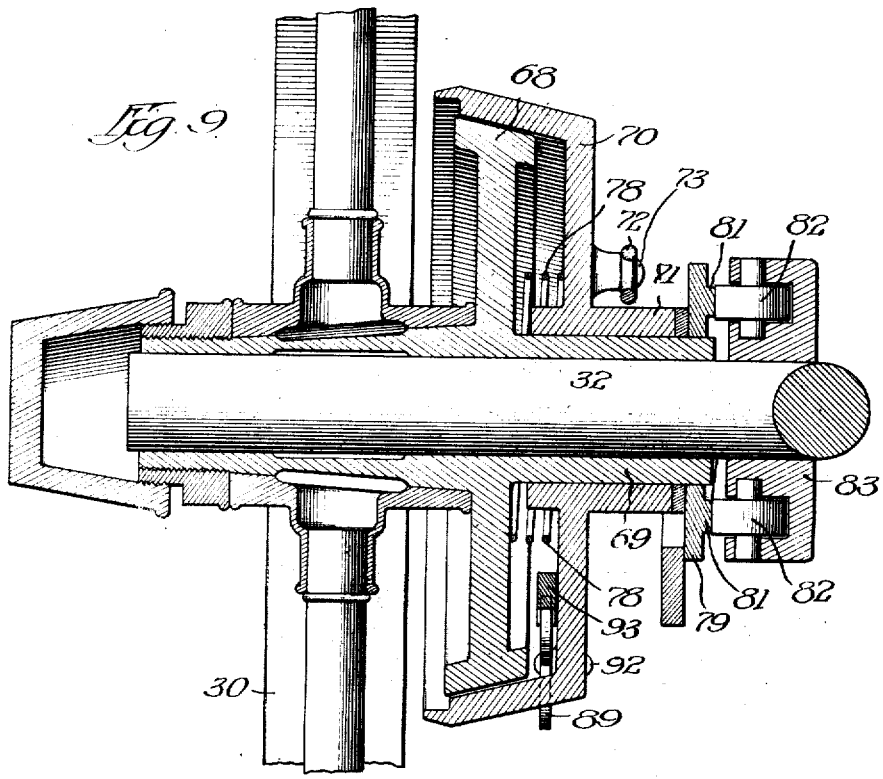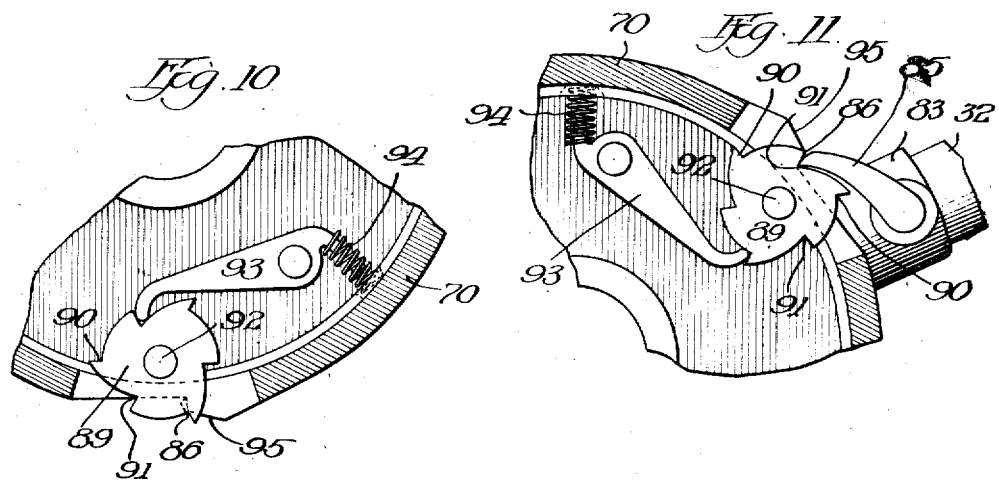

IRA A. WEAVER, OF SPRINGFIELD, ILLINOIS, ASSIGNOR, BY MESNE ASSIGNMENTS, TO MONTGOMERY WARD & CO. INCORPORATED, OF CHICAGO, ILLINOIS, A CORPORATION OF NEW YORK.

LIGHT-TRACTOR GANG-PLOW.

1,238,969.  Specification of Letters Patent.  Patented Sept. 4, 1917.

Application filed March 22, 1915. Serial No. 16,045.

*To all whom it may concern:*

Be it known that I, IRA A. WEAVER, a citizen of the United States, residing at Springfield, in the county of Sangamon and State of Illinois, have invented certain new and useful Improvements in Light-Tractor Gang-Plows, of which the following is a specification.

The object of this invention is the provision of a gang plow especially adapted for light traction engines so designed that the operator of the engine may have full control of the plow from his seat. The larger engines and plows in common use are both provided with platforms and two men are employed to handle the outfit, one to run the engine and the other to manage the plows. The modern small tractor is provided with a single seat for the operator and it is extremely difficult for him to remain in his seat and operate the control levers on the plow which are in the rear for the reason that the levers are quite beyond his reach. To overcome this difficulty I have provided a screw mechanism with a crank arranged in easy reach of the operator of the engine so that the depth may be easily regulated, and have also provided means whereby the plows can be leveled by the same crank mechanism.

Another feature of the invention is the automatic lift controlled by the operator through a cord such as a rope, chain, or rod whereby the plows may be raised automatically at the end of the furrow and also so arranged that a slight pull on the cord will cause the plow to cut less deeply in order to relieve the engine in passing through soft marshy spots in the field.

A further feature of the invention consists in the provision of means whereby one of the plows may be disengaged entirely for the time being or permanently to relieve the load of the engine when the traction surface is poor or when the load is too great to pull all the plows composing the gang.

A further improvement consists in the manner of connecting and bracing the plow units so that all the parts are perfectly interchangeable and a more rigid construction is secured.

Other improved features relating to flexibility of connection and high lift will be made apparent as the description proceeds.

In order that the invention may be readily understood by those skilled in the art a preferred embodiment of the same is set forth in the accompanying drawings and detailed description based thereon. Obviously the construction may be modified to embrace equivalent mechanical features for obtaining the same results in varying degrees wherefore it will be understood that the drawing and description are to be taken in an illustrative and not in an unnecessarily limiting sense. In the drawings—

Figure 1 is a top plan view of a gang plow embodying the invention;

Fig. 2 is a side elevation of the same with the last plow indicated in dotted lines in elevated position;

Fig. 3 is an enlarged detail view of the screw mechanism for controlling the plows;

Fig. 4 is a longitudinal section through a portion of Fig. 3 on a yet larger scale.

Figs. 5 and 6 are respectively sectional details on the lines 5—5 and 6—6 of Fig. 4;

Fig. 7 is a top plan view of the clutch mechanism for elevating the plows;

Fig. 8 is a side elevation of the clutch mechanism;

Fig. 9 is a vertical section through the clutch mechanism on the line 9—9 of Fig. 8;

Figs. 10 and 11 are fragmentary views showing the tripping mechanism of the clutch;

Fig. 12 is an elevational view of a bracing connection; and

Fig. 13 is a transverse section on the line 13—13 of Fig. 12.

Referring to the drawings it will be observed that the beams 21 and 22 of the two forward plow units 23 and 24 are securely united by means of the cross member 25 while the beam 26 of the rear plow unit 27 is attached to the others by means of a crank lever mechanism indicated generally at 28. While I have illustrated two permanently connected plow units and one detachable unit it is obvious that there might be three or more plow units rigidly secured to each other with another unit attached with a lever mechanism. It is not considered good practice, however, to make a gang of more than four plows rigidly secured to each other as they will not do good work over rough or uneven ground.

The plow is carried by two wheels 29 and 30, the former running in the furrow and the latter on the land. These wheels are mounted on the axles 31 and 32 which have crank portions journaled in the beams 21 and 22 at 33 and 34 respectively. The two hitch bars 35 and 36 are secured to the forward end of the beams 21 and 22, and to the hitch bars are attached adjustable draw bars 37 and 38 which lead to the engine. An upright bar 39 is secured to the front end of the plow frame at 40 and is braced by the members 41 and 42 thus forming a forward support for the adjusting screw spindle 43.

The rear end of the screw spindle 43 is connected to the cranked portions 44 and 45 of the axles 31 and 32 by means of rocker arms 46 and 47 respectively. The rocker arm 46 is connected by means of links 48 with the nut 49 engaging the threaded portion of the spindle 43, while the rocker arm 47 is pivoted at 50 to a yoke 51 within which is mounted a friction controlled nut 52 which includes a threaded block 53 pressed into engagement with the threads of the screw spindle 43 by means of springs 54, 54. Ball bearings 55—55 provide for the anti-friction mounting of the nut within the yoke 51. The nut is optionally held against rotation by means of a detent arm 56 projecting from a collar 57 secured to the rock shaft 58, the forward end of which terminates in a handle 59 located adjacent the hand crank 60 of the screw spindle 43, both within convenient reach of the operator seated on the engine. This rock shaft 58 is frictionally held in adjusted angular position with the detent arm in or out of engagement with the recesses 61 of the nut 52 by means of a leaf spring 62 mounted on the yoke 51 and resting upon the collar 57.

From the above it will be apparent that if the spindle 43 is rotated by means of the hand crank 60 and the nut 52 is prevented from rotating by the detent 56, both nuts 49 and 52 would travel uniformly upon the screw spindle 43 and would thereby crank the axles 31 and 32 to an equal extent, thereby changing the depth of the plow units 23 and 24 or raising them to their extreme height when desired.

The plow units 23 and 24 may be leveled up or the furrow wheel 29 may be elevated in relation to the land wheel 30 to open up a new land by disengaging the detent 56 from the nut 52 by means of the rock shaft 58. If the screw spindle 43 is now rotated by means of the hand crank 60 the nut 49 will travel upon the spindle while the nut 52, by reason of the friction between the spindle and the friction block 53, will revolve with the spindle and will not travel thereon. Thus no cranking motion will be transmitted to the land axle 32.

It will be observed that the rock shaft 58 is graduated at 63, the gradations of which read relative to the guide 64 so that the operator may set the plow units to cut to the proper depth before they enter the soil.

Stops are likewise provided at 65 and 66 to define the limits of movement of the nut 52 upon the screw spindle 43 so as to prevent over-adjustment of the plow units. Adjustable stops 67 on the screw spindle 43 are likewise provided which coact with the guiding brace 39 to prevent over-adjustment of the axles.

The power lift consists of a cone friction clutch mechanism mounted on the land axle 32 and is shown in detail in Figs. 7 to 11 inclusive. The inner clutch member 68 is carried by the sleeve 69 of the axle 32 while the outer clutch member 70 is mounted to rotate freely on the said sleeve 69 as shown clearly in Fig. 9. The clutch member 70 has a hub 71 on which the chain 72 may wind, one end of the chain being secured to the clutch member 70 at 73 and the other end secured to an arm 74 extending outwardly and downwardly from the plow frame and rigidly secured thereto. The connection between the chain 72 and the arm 74 is by means of a hook member 75 provided with a series of holes 76 for engagement by the connecting bolt 77 whereby to secure adjustability. The two clutch members 68 and 70 are held yieldingly out of engagement by means of the spring 78 and are brought into engagement by means of a lever 79 to which a cord such as a chain, rod or rope 80 is secured and extends within easy reach of the operator. The lever 79 is provided with two cam faces 81—81 arranged to co-act with the rollers 82, 82 mounted in the bracket 83 secured to the axle 32. A projection 84 from the bracket 83 carries a spring pressed pawl 85 which is adapted to engage within a notch 86 on the clutch member 70 when the plow is to be elevated. A member 87 has a slotted connection at 88 with the lower end of the lever 79 and also a slotted connection with the lower end of the arm 74, thus forming an adjustable stop to limit the cranking movement of the axle 32. A toothed wheel 89 having alternate shallow notches 90 and deep notches 91 is pivoted at 92 on the inner side of the clutch member 70 with its teeth projecting through a slot adjacent the notch 86. The pawl 93 prevents backward movement of the toothed wheel 89 and holds the same in position under the action of the spring 94.

The operation of the power lift is as follows: When the operator pulls the cord 80 the cam faces 81 of the lever act against the rollers 82 thus crowding the two clutch members 68 and 70 together against the influence of the spring 78 and the friction engagement between the clutch members causes the member 70 to rotate with the land wheel thereby causing the chain 72 to wind upon the drum 71 and cranking the axle 32 until the movement is checked by the slotted member 87 acting against the pull of the cord on the lever 79. At this point the notch 86 and the toothed wheel 89 have been carried a few degrees in advance of the pawl 85. When the cord is released the weight of the plow starts a reverse motion which is finally stopped by the engagement of the pawl 85 in the notch 86 as shown in Fig. 11. During this movement the pawl has engaged one of the deep notches 91 of the toothed wheel 89 and moved it to the position shown in said Fig. 11. To lower the plow the clutch is again thrown in operation by a pull upon the cord 80 and the forward movement of the clutch member 70 carries the toothed wheel 89 a few degrees in advance of the pawl 85, and when the cord is again released and the clutch member 70 begins its reverse movement the pawl 85 engages within a shallow notch 90 which holds the point of the pawl at sufficient elevation to cause the same to clear the notch 86 and to ride up the inclined face 95 on to the peripheral surface of the clutch member 70. This permits the reverse movement of the clutch member 70 and drum 71 allowing the descent of the plows into the soil. By applying light tension to the lifting cord 80 the plow can be lifted part way so as to temporarily relieve the load upon the engine if the drive wheels of the latter begin to slip or to sink in marshy soil.

The movement of the cranked portion 45 of the axle 32 under the action of the clutch mechanism is transmitted to the cranked portion 44 of the axle 31 through the rocker arms 47 and 46 and their connection with the screw spindle 43. It will be apparent that the screw spindle 43 will slide through its bearing on the upper end of the brace 39. It is also apparent that the rocker arm 47 is shorter than the rocker arm 46. This makes the plow self-leveling when raising it to its extreme height which is made necessary by the fact that one wheel is working in the furrow and the other on the uncultivated land. The arm 47 extends also below the cranked portion 45 of the axle 32 as clearly shown in Fig. 3. And to this lower projection 96 a rod 97 is adjustably connected by means of the holes 98. This rod 97 extends loosely through a hole in the upright bar 39 and also through a hole in the brace 99 on the draw bar 38. The forward end of the rod 97 is provided with a spool 100, the end flanges 101—101 of which limit the forward and backward movement of the rod relative to the brace 99. This spool 100 has a threaded engagement with the forward end of the rod 97 whereby the spool may be adjusted relative to said rod.

It will be noted that the depth at which the plows run is controlled by the two carrying wheels 29 and 30. The draw bars 37 and 38 are connected to the plow so as to provide for free vertical movement thus permitting the engine to pass over rough and uneven ground without affecting the operation of the plows. This obtains so long as the unevenness of the ground will not cause a relative movement between the draw bars and hitch bars sufficient to take up the play allowed by the spool 100 working through the bracket 99. When the plow is elevated this rod 97 is drawn backward by the rocker arm projection 96 and, as the forward end of the draw bar 38 is prevented from lifting by being connected with the engine, it is evident that the rear plows will be held in elevated position by means of the rod 97 which forms a truss over the hitch bar 36 and draw bar 38.

By reference to Figs. 1 and 2 of the drawing it will be observed that the two beams 21 and 22 and the plow units 23 and 24 are rigidly secured together and the third beam 26 and plow unit 27 are connected to the forward plows by the bracket 102 which forms a journal for the crank lever 28 which extends beneath the beam 26 and is journaled in a box 103 secured on the under side thereof. The operating handle 104 is riveted at 105 to the extension 106 of the crank lever 28 and is provided with the usual hand grip 107 and spring plunger 108 to engage the sector 109. The forward end of the beam 26 is connected to the arm 74.

It will be apparent from the above that the plow unit 27 is attached to and normally operated in unison with the plow units 23 and 24 through the power lift mechanism and the screw spindle adjustment by reason of its connection with the beam 22. It will also be observed that by means of the lifting lever 104 it can be elevated to the position shown in dotted lines in Fig. 2 so as to be thrown out of commission for the time being where the traction conditions or soil conditions are such as to call for the use of but two plows in the gang. The method of connection between the plow beam 26 and the plow beam 22 is also such as to permit of the ready disengagement of the plow beam 26, the plow unit 27 and their appurtenant parts so as to make a gang of but two plows where desired.

By reference to Figs. 12 and 13 the method of bracing and connecting the various portions of the plow frame will be made clear. Heretofore it has been the usual practice to secure two plow beams together by forging the brace into the groove of the beams and this necessarily makes the parts non-interchangeable. If a snug fit is required, owing to the peculiar section of the plow beam billet, it has been found very difficult to form bracing members in such a way that they would perfectly interchange with different beams on account of one side of the flange of the beam being thicker than the other due to the bending operation. This difficulty has been overcome according to the present invention by first drilling the bolt hole 110. A tool is then centered by this hole and mills an annular groove 111 about the hole. One-half of the diameter of this rim is milled in the beam member 112 and the other half is formed as a similar groove 113 in the brace 114. If the beam is slightly twisted it is evident that the groove will be a little deeper on one side than the other to compensate for such twisting. A ring 115 is then laid in the space between the two opposed faces of the grooves 111 and 113 and the braces 114 are clamped upon the ring and beam by means of the connecting bolts 116. This method of connecting the braces and beams takes most of the strain from the bolt and insures a close fit and prevents a shifting of the parts.

I claim:

1. In a gang plow, the combination with a plurality of plow units, of an auxiliary effective plow unit arranged as the last of the gang on the land side, means for controlling the several units in unison and while in operation, and means to raise and lower said auxiliary plow unit independently of the other units whereby to vary the number of operative plows in the gang, the several units being relatively rigid in use.

2. In a gang plow, the combination with a plurality of plow units, of an auxiliary plow unit detachably mounted as the last of the gang on the land side, means for controlling the several units in unison and while in operation, and means to raise and lower said auxiliary plow unit in unison with and independently of the other units whereby to vary the number of operative plows in the gang, the several units being relatively rigid in use.

3. In a gang plow, the combination with the plow frame, a plurality of plow units, and means for controlling the same in unison while in operation, of an auxiliary plow unit arranged as the last of the gang on the land side, the beam of said unit having a draft connection to the plow frame, a cranked lever suitably fulcrumed with its cranked portion journaled in the beam of the auxiliary unit, a sector carried by the auxiliary unit, and a lever operating handle arranged to engage the sector whereby to sustain the auxiliary unit in an elevated and lowered position independently of the other unit, the several units being relatively rigid in use.

4. In a gang plow, the combination with the plow frame, a plurality of plow units, and means for controlling the same in unison while in operation, of an auxiliary plow unit arranged as the last of the gang on the land side, the beam of said unit having a pivoted draft connection to the plow frame, a cranked lever suitably fulcrumed on the adjacent unit of the gang with its cranked portion journaled in the beam of the auxiliary unit, a toothed sector, and a lever operating handle arranged to engage the sector whereby to raise and sustain the auxiliary unit in an elevated position independently of the other units, the several units being relatively rigid in use.

5. In a gang plow, the combination with the plow frame, a plurality of plow units, and means for controlling the same in unison while in operation, of an auxiliary plow unit arranged as the last of the gang on the land side, the beam of said unit having a detachably pivoted draft connection to the plow frame to the rear of the axle, a cranked lever detachably fulcrumed on the adjacent unit of the gang with its cranked portion journaled in the beam of the auxiliary unit, a toothed sector, and a lever operating handle arranged to engage the sector whereby to raise and sustain the auxiliary unit in an elevated position independently of the other units, the several units being relatively rigid in use.

6. In a tractor plow, the combination with carrying wheels, a cranked axle, and plow units mounted on the cranked axle for raising and lowering, of a hitch comprising a draft bar attached to the tractor and pivoted to the plow to provide vertical flexibility, and a tie rod connected at its forward end to the draft bar to provide limited lost motion and at its rear end to the cranked axle whereby to throw the weight of the plows on the draft bar to secure rigidity when the plow units are elevated.

7. In a tractor plow, the combination with carrying wheels, a cranked axle, and plow units mounted on the cranked axle for raising and lowering, of a hitch comprising a draft bar attached to the tractor and pivoted to the plow to provide vertical flexibility, a tie rod, a spool adjustably mounted on the forward end of said rod, the shank of the spool slidable within an aperture of the draft bar with its flanges on opposite sides thereof to provide limited lost motion, said rod at its rear end connected to the cranked portion of the axle whereby to throw the weight of the plows on the draft bar to secure rigidity when the plow units are elevated.

In testimony whereof I have hereunto signed my name in the presence of two subscribing witnesses.

IRA A. WEAVER.

Witnesses:
R. C. BENNETT,
R. W. BOEHMLER.